(12) United States Patent
Connolly et al.

(10) Patent No.: US 6,407,905 B1
(45) Date of Patent: Jun. 18, 2002

(54) ELECTRONIC COMPONENTS

(75) Inventors: Joseph Connolly, Spital (GB); Tommy Holmgren, Ludvika (SE); Martin Carlen, Niederrohrdorf (CH); Dennis Young-Cannon, Upton by Chester (GB)

(73) Assignee: ABB Corporate Research Ltd., Dattwil (CH)

( * ) Notice: Subject to any disclaimer, the term of this patent is extended or adjusted under 35 U.S.C. 154(b) by 0 days.

(21) Appl. No.: 09/762,289

(22) PCT Filed: Aug. 9, 1999

(86) PCT No.: PCT/EP99/05830
§ 371 (c)(1),
(2), (4) Date: Apr. 30, 2001

(87) PCT Pub. No.: WO00/08661
PCT Pub. Date: Feb. 17, 2000

(30) Foreign Application Priority Data

Aug. 7, 1999 (GB) .............................. 9817120

(51) Int. Cl.$^7$ .............................................. H01G 4/005
(52) U.S. Cl. .................. 361/303; 361/320; 361/313; 361/311; 361/306.1; 361/273
(58) Field of Search ................................ 361/303, 320, 361/301.4, 306.1, 313, 311, 314, 273, 305, 321

(56) References Cited

U.S. PATENT DOCUMENTS

| | | | | | |
|---|---|---|---|---|---|
| 4,685,019 A | * | 8/1987 | Needham | ........................ | 361/2 |
| 5,295,289 A | * | 3/1994 | Inagaki et al. | ............. | 29/25.42 |
| 5,548,134 A | * | 8/1996 | Tailliet | ........................ | 257/173 |
| 5,903,431 A | * | 5/1999 | Wilmot | ........................ | 361/311 |
| 6,002,576 A | * | 12/1999 | Asakura et al. | ............. | 361/311 |

FOREIGN PATENT DOCUMENTS

| | | | |
|---|---|---|---|
| EP | 0813213 A1 | * | 12/1997 |
| JP | 04165063 | * | 10/1992 |

* cited by examiner

Primary Examiner—Dean A. Reichard
Assistant Examiner—Nguyen Ha
(74) Attorney, Agent, or Firm—Dennison, Schultz & Dougherty

(57) ABSTRACT

A capacitor electrode includes a film base member having connection means located thereon so that the capacitor electrode may be connected to an external component, and a segmented metallized layer connected to the connection means, the metallized layer being made of metallized segments interconnected by current gates. The segmented, metallized layer has a thickness which varies or differs continuously along a length thereof, and the current gates have a width which increases as the thickness of the segmented metallized layer decreases.

9 Claims, 2 Drawing Sheets

ELECTRONIC COMPONENTS

BACKGROUND OF THE INVENTION

The present invention relates to improvements in or relating to electronic components. More particularly, the present invention relates to improvements in or relating to capacitors, in particular, capacitor electrodes.

The advancement of power semiconductor devices has resulted in reductions in manufacturing costs, component count and maintenance. This has resulted in the production of cheaper, more compact, lighter and quieter electronic equipment.

Over the last 30 years, traction and power transmission systems have seized upon these advances and consequently, the mass and volume of traction and power systems have also been significantly reduced.

As the result of continued evolution of power electronic systems, capacitor manufacturers have had to reduce the cost, mass and the volume of capacitor components. The impetus behind capacitor evolution has been to follow the positive advances of other electronic components, that is, with a view to reducing the final unit cost thereof. This has generally been reflected by the increase in energy density (J/liter) of capacitors. In recent years, the limits of capacitor design have been extended to enable the thin polymeric films of the capacitor electrodes, having a thickness of 1–30 $\mu m$, to be subjected to >200 V/$\mu m$ at elevated temperatures, for lifetimes of 20 years or more, giving energy densities in excess of 200 J/liter.

With a view to reducing the cost, mass and volume of such capacitor components, it is known to utilise specific independent techniques in order to increase the voltage stress capability of capacitors (Voltage stress being expressed as volts per micron (V/$\mu$)). For example, it is known to increase the limits of plain metallised film capacitors by the independent application of either gradation of the metallised surface of the capacitor electrode, or by utilising segmentation techniques. The limits of utilising such known techniques have now been reached.

Therefore, there is a need for a new technique in which to achieve a capacitor design with greater voltage stress capability than previously known.

SUMMARY OF THE INVENTION

According to a first aspect of the present invention there is provided a capacitor electrode comprising a film base member upon which is located connection means so that the capacitor electrode may be connected to an external component, and connected to the connection means a segmented metallised layer having metallised segments interconnected by current gates, characterised in that the segmented metallised layer is gradated.

It is an object of the present invention to provide an improved capacitor electrode. In particular, and since the segmented metallised layer is gradated, i.e. since the metallised layer is deposited such that the thickness of the segmented metallised layer varies along the length of the capacitor electrode, the voltage stress capability of a capacitor in accordance with the present invention is surprisingly greater than that obtainable by currently utilised techniques.

It is believed to be worthy of note that in the active technical field of capacitor design, no one has considered, or disclosed, the idea of gradating the segmented metallised layers present on such capacitor electrodes, that is, with a view to increasing the voltage stress capability of a capacitor.

The combination of such techniques enables two levels of electrical breakdown protection to be implemented into the capacitor electrode design. The first level of protection is achieved by the gradation, which will reduce the amount of the active capacitor area lost for each small-scale self-healing operation, namely, by burning off a portion of the metallised layer such that the weak point on the capacitor electrode is isolated. The second level of electrical protection concerns larger electrical faults that are protected against by splitting the metallisation surface into a specific pattern or segments, interconnected by current or fuse gates. Such patterns are generically referred to as "T-notch" and "Mosaic". In the event of a larger electrical fault, the fuse gates will burn off resulting in the isolation of a complete segment.

In a preferred embodiment, the width of the current gates increases as the thickness of the segmented metallised layer decreases. Preferably, the width of the current gates increases in such a manner that the cross sectional area of the all the current gates on a capacitor electrode are constant or substantially constant. This has the advantage in that the current gates located in the thinner regions of the segmented metallised layer will be less prone to burning off in the event of a small-scale self-healing operation and hence, the isolation of a complete segment, and the large capacitance loss associated therewith, is avoided.

In a preferred embodiment, the segmented metallised layer has a gradated profile as shown in any one of FIGS. 1a, 1b, 1c, 1d and 4.

Further preferably, the film base member comprises biaxially orientated polypropylene.

Preferably, the segmented metallised layer nearest the connection means is maintained at a resistivity of 2–5 Ω/square.

Further preferably, the segmented metallised layer comprises aluminium and/or zinc in variable concentrations, plus trace pure metals.

In a further aspect of the present invention there is provided a process for producing a capacitor electrode comprising the steps of:

providing a surface of a film base member with a masking pattern, placing the film base member in a partial vacuum;

passing the film base member by a member provided with a slit; and evaporating metal from the slit to form a metallic cloud such that a metal layer is deposited onto the film base member such that the segmentation of the deposited metal layer is determined by the masking pattern and the gradation of the deposited metal layer is determined by the shape of the slit.

In another aspect of the present invention there is provided a capacitor including a capacitor electrode in accordance with the present invention.

BRIEF DESCRIPTION OF THE DRAWINGS

Non-limiting embodiments of the present invention will now be described by way of example to the accompanying drawings in which.

DESCRIPTION OF THE PREFERRED EMBODIMENTS

As illustrated in FIGS. 1a–d, a capacitor electrode 10 in accordance with a first embodiment the present invention having a width X, comprises a polymeric film base member 14 upon which is located a reinforced edge 11 of metal, which enables the electrode capacitor 10 to be connected to external components (not illustrated).

Figure 1A:
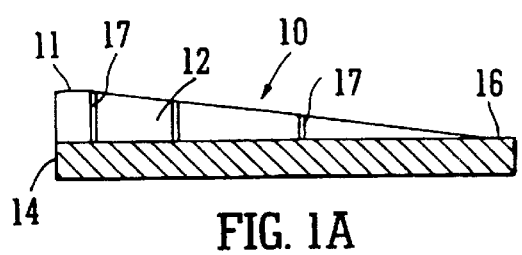
FIGS. 1a, b, c, d are side views of a capacitor electrode in accordance with a first embodiment of the present invention, each FIG. showing different gradation profiles of the segmented metallised layer.
Figure 1B:
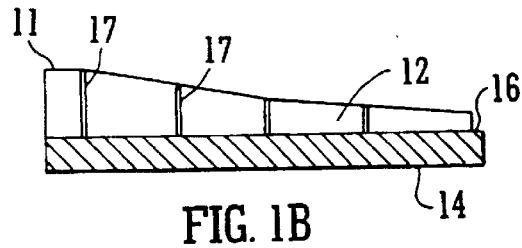
Figure 1C:
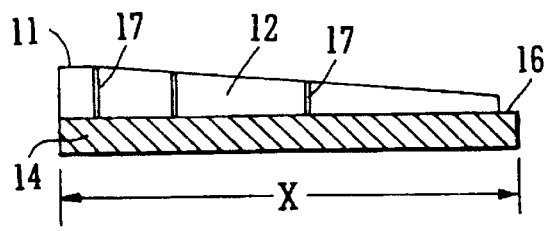
Figure 1D:
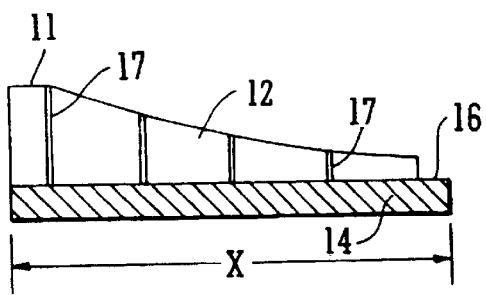
Figure 2:
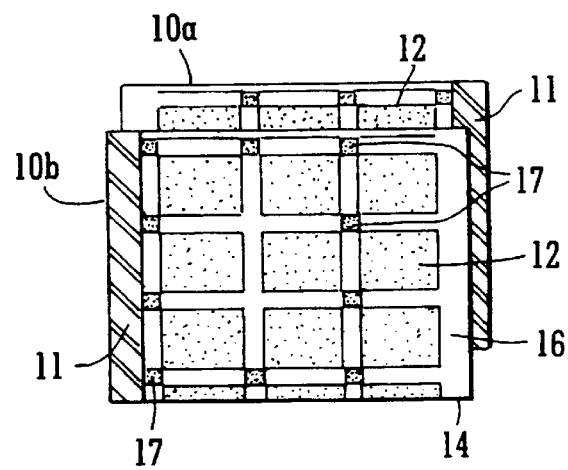
FIG. 2 is a plan view of a capacitor electrode in accordance with a first embodiment of the present invention when located on top of an adjacent second capacitor electrode in accordance with the present invention.

The polymeric film base member 14, preferably comprises a biaxially oriented polypropylene which is corona treated and has an oil based mask containing a periodically repeating pattern, for example, as shown in FIG. 2. It is to be understood that the technique of using an oil based mask to form the segment pattern can partially or wholly be substituted for a laser cutting technique whereby a laser cuts an evenly metallised layer to form the segment pattern.

The reinforced edge 11 is not part of the active capacitor width, which commences following the fuse or current gates 17, which connect the reinforced edge 11 to the segmented metallised area 12.

The active area of the capacitor electrode 10 comprises a segmented metallised layer 12 having a gradated profile (see FIGS. 1a–d). As shown in FIG. 2, the segmented metallised areas 12 are interconnected via current or fuse gates 17.

The metallisation nearest the reinforced edge 11 is maintained at a low resistivity, preferably, 2–5 Ω/square, linearly or exponentially increasing at variable gradients to the remote part of the capacitor electrode 10. As illustrated, an area 16 of the polymeric base film member 14 is left free from the segmented metallised layer 12. The gradation is to be applied in conjunction with known segmentation techniques which, and as same are well known, will not be described further herein.

Figure 3:
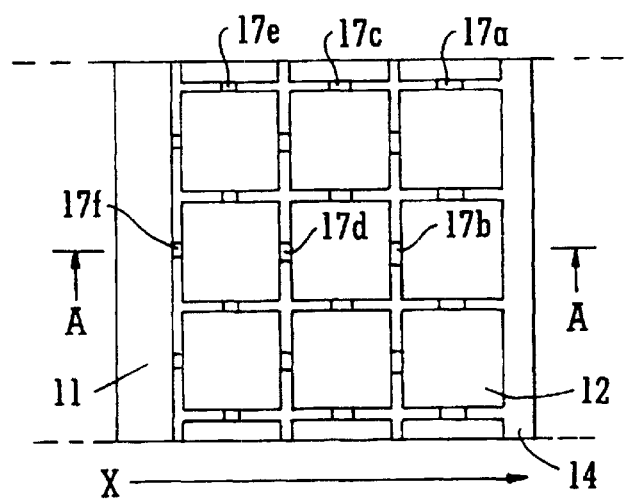
FIG. 3 is a plan view of a capacitor electrode in accordance with a second embodiment of the present invention.
Figure 4:
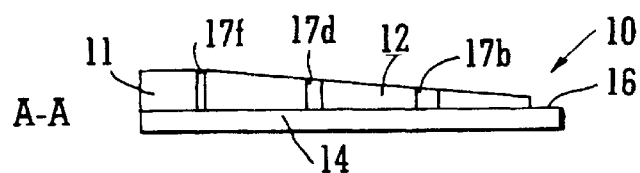
FIG. 4 is a side view of the capacitor electrode of FIG. 3.
Figure 5:
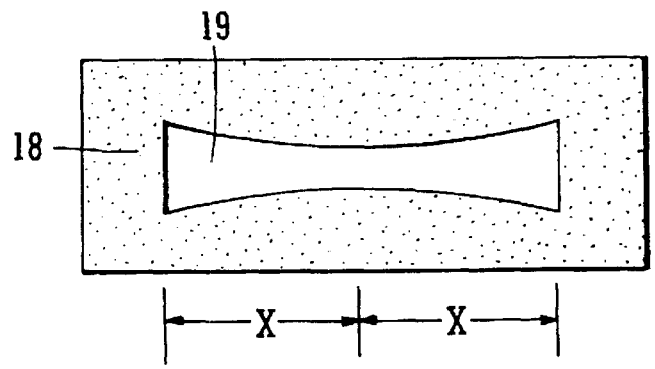
FIG. 5 illustrates one embodiment of a "grading mask" utilised to create the gradation of the segmented metallised layer located on the polymer film base member of a capacitor electrode in accordance with the present invention.

As illustrated in FIGS. 3 and 4, in a preferred embodiment, the width of the current gates 17e, 17c and 17a increases in direction X as the thickness of the segmented metallised layer 12 decreases. That is, current gate 17c is wider than gate 17e, and current gate 17a is wider than current gate 17c and hence, current gate 17c. Additionally, and as illustrated, current gate 17b is wider than current gate 17d, and current gate 17d is wider than current gate 17f. As outlined above, this has the advantage in that the current gates located in the thinner regions of the metallised segmented layer would be less prone to burning off in the event of a small scale self-healing operation and hence, the isolation of a complete segment, and the large capacitance loss associated therewith, is avoided.

A capacitor electrode 10 in accordance with the present invention is obtained by placing the polymeric film base member 14 into a vacuum chamber, providing a partial vacuum, wherein it is passed over a plate 18, sometimes referred to in the art as a "grading mask", containing an opening or slit 19 of a specifically changing width situated tangentially to the direction of travel of the polymeric film base member 14. Underneath this opening or slit 19, metal is evaporated to form a metallic cloud. As a result of the opening or slit 19 in the grading mask 18, the metal is deposited onto the polymeric film base member 14, where it condenses to create a thin layer of metal 12 in a pattern determined by the oil mask pattern creating the segmentation, and the metal gradation caused by opening or slit 19 of the. grading mask 18. It is to be understood that the film base member can be passed under the slit such that the metal can be evaporated from above.

The skilled person will realise that the variable width of the opening or slit 19 is fixed for a particular grading mask 18. Consequently, the grading mask 18, must be changed for each different metal grading profile. Preferably, the metals used in the process are aluminium and/or zinc, in variable concentrations, plus trace pure metals.

As shown in FIG. 2, by gradating the segmented metallised layer 12 in such a manner, the skilled person will realise that the present invention also enables the metal thickness of two adjacent capacitor electrodes 10a and 10b to be maintained at a particular thickness. In particular, this thickness will be variable across the capacitor electrode 10, so that the thinner layer of segmented metallisation applied to an electrode 10a coincides with the thicker layer of segmented metallisation provided on the polymeric base film member of an adjacent capacitor electrode 10b. As a result thereof, the onset of a small area dielectric breakdown will cause the vaporisation of the metal on the thinner electrode, before the thicker electrode is vaporised. This enables the minimisation of the active capacitor area lost upon small breakdowns. The metal gradation on the capacitor electrode 10 concerns the first level of self-healing protection. As will be realised, the second level of protection will be contained within the segmentation of the capacitor electrode 10.

Although the present application has described various gradation profiles, it is to be understood that same can cover any gradated profile which is obtained, for example, by a vacuum deposition metallisation applied to selfhealing polymer film capacitors utilising any segmentation pattern. As will be realised, the application of graded metallisation will control the current density across the width of the polymeric film base member 14, which differs from a plain metallisation profile where the current density will decrease linearly as a function of the distance from the reinforced edge 11 of the capacitor electrode 10.

What is claimed is:

1. A capacitor electrode comprising:
   a film base member having connection means located thereon so that the capacitor electrode may be connected to an external component, and
   a segmented metallized layer connected to the connection means, the metallized layer comprising metallized segments interconnected by current gates,
   the segmented metallized layer having a thickness which varies or differs continuously along a length thereof, and the current gates having a width which increases as the thickness of the segmented metallized layer decreases.

2. A capacitor electrode as claimed in claim 1, wherein the current gates have a cross sectional are which is substantially constant throughout the segmented metallized layer.

3. A capacitor electrode as claimed in claim 1, wherein the film base member comprises biaxially orientated polypropylene.

4. A capacitor electrode as claimed in claim 1, wherein the segmented metallized layer has thickness which varies along a length thereof from a high point to a low point.

5. A capacitor electrode as claimed in claim 1, wherein the segmented metallized layer nearest the connection means is maintained at a resistivity of 2–5 ohms/square.

6. A capacitor electrode as claimed in claim 1, wherein the segmented metallized layer comprises aluminum, zinc or mixtures thereof in variable concentrations, plus traces of pure metals.

7. A capacitor including a capacitor electrode as claimed in claim 1.

8. A process for producing a capacitor electrode comprising a film base member having connection means located thereon so that the capacitor electrode may be connected to an external component and a segmented metallized layer connected to the connection means, the metallized layer comprising metallized segments interconnected by current gates, the segmented metallized layer having a thickness which varies or differs continuously along a length thereof, and the current gates having a width which increases as the thickness of the segmented metallized layer decreases, the process comprising the steps of:

providing a surface of a film base member with a masking pattern, and placing the film base member into a vacuum;

passing the film base by a member provided with a slit; and evaporating metal from the slit to form a metallic cloud, thereby causing a metal layer to deposited onto the film base member, segmentation of the deposited metal layer being determined by the masking pattern and gradation of the deposited metal layer being determined by the shape of the slit.

9. A process as claimed in claim 8, wherein the evaporated metal comprises aluminum, zinc or a mixture thereof in variable concentrations, plus traces of pure metals.

* * * * *